United States Patent

[11] 3,552,287

[72] Inventors William C. Fink
Williamsport;
John W. Shaffer, Montoursville, Pa.
[21] Appl. No. 707,649
[22] Filed Feb. 23, 1968
[45] Patented Jan. 5, 1971
[73] Assignee Eastman Kodak Company
Rochester, N.Y.
a corporation of New Jersey. by mesne assignment

[54] PHOTOFLASH LAMP FIRING MECHANISM
6 Claims, 4 Drawing Figs.

[52] U.S. Cl. .................................................. 95/11.5,
431/93
[51] Int. Cl. ...................................................... G03b 9/70
[50] Field of Search............................................ 431/92-
—95, 267, 269, 270; 95/11, 11Lamp, 11.5

[56] References Cited
UNITED STATES PATENTS
970,358   9/1910  Shoberg ........................ 431/97
1,083,749 1/1914  Lighthipe ...................... 431/269X
2,024,225 12/1935 Igari ............................. 431/93
2,049,735 8/1936  Grogin .......................... 95/11.5
2,498,277 2/1950  Kaplowitz...................... 95/11.5
2,753,773 7/1956  Smith ............................ 95/11.5
2,972,937 2/1961  Suits.............................. 95/11.5

FOREIGN PATENTS
405,248 1/1934 Great Britain................ 431/95

Primary Examiner—John M. Horan
Assistant Examiner—Fred L. Braun
Attorneys—Norman J. O'Malley and Joseph C. Ryan ABSTRACT: A photographic camera having a photoflash lamp firing mechanism for percussive-type flashlamps. The lamp firing mechanism consists of a metal spring which is released from its energized position in response to operation of the camera shutter and strikes the percussive-type lamp to effect the firing thereof. The firing mechanism also has a setting member accessible from outside the camera casing for moving the metal spring to its energized position.

PATENTED JAN 5 1971

INVENTORS
WILLIAM C. FINK
JOHN W. SHAFFER

BY *Joseph C. Ryan*
ATTORNEY

PHOTOFLASH LAMP FIRING MECHANISM

This invention relates to photographic apparatus and more particularly to camera mechanisms designed to fire a flashlamp with which the camera is provided.

For many years most cameras sold commercially have been provided with a source of electrical energy, such as dry cell batteries, which provide the means for energizing and firing flashlamps of the electric primer type. In some cases the batteries are located in a compartment provided therefor within the main body of the camera whereas in other cases the batteries are located in an attachment, usually called a flashgun.

More recently a percussive-type lamp has been suggested. Generally speaking, a percussive-type photoflash lamp comprises an hermetically sealed, light-transmitting envelope containing a source of actinic light and having a primer associated therewith. More particularly, the percussive-type photoflash lamp comprises a length of glass tubing constricted to a tip at one end thereof and having a primer secured to the other end thereof. The length of glass tubing which defines the lamp envelope contains a combustible such as shredded zirconium foil and a combustion-supporting gas such as oxygen. The primer comprises a metal shell within which an anvil and a charge of fulminating materials are disposed.

Operation of a percussive-type photoflash lamp is initiated by a firing pin which is caused to strike the primer cup or shell to promote ignition of the charge of fulminating material disposed therein. Deflagration of the charge ignites the shredded foil, the combustion of which is the source of the actinic light.

The firing mechanisms which have been suggested heretofore for firing a percussive-type photoflash lamp have been relatively complex. They usually include a hammer to actuate the firing pin, a hammer cocking mechanism, a hammer latching mechanism, etc. There are a multitude of rather massive levers, axles and springs which have to be actuated when the firing mechanism is cocked. It takes quite a heavy spring to overcome the friction and to produce enough force to overcome the inertia of the moving parts when the impact motion starts. The stopping of the heavy parts also will produce a vibration in the camera housing which may produce a blur in the picture.

In view thereof, the principal object of this invention is to provide a firing mechanism for percussive-type photoflash lamps which is relatively simple in construction, relatively easy to operate and able to provide a high velocity impact without producing a disturbing vibration in the camera body.

This and other objects, advantages, and features are attained, in accordance with the principles of this invention by a firing mechanism which consists essentially of one moving part, a metal spring of rectangular or circular cross section, moving with infinitesimal friction at high velocity, firmly secured at one end thereof to a camera body while the other end thereof is free and may carry a firing pin attached thereto preferably near the free end thereof. The energy is delivered by releasing the spring from a bent position. The lamp is held securely in a suitable socket in register with the firing pin or striking area of the spring. The final impact velocity and energy delivered may be regulated by the mass of the striking area of the spring or pin, by the temper of the spring, by its length and by its cross-sectional dimensions. We have found, quite surprisingly, that the reliability of firing of percussive-type flashlamps is greatly improved by using a higher impact velocity rather than higher total energy. The firing mechanism of this invention can develop from about 0.5—10 in.-oz. kinetic energy at high impact velocities of from about 500 to 6,000 cms./sec., in a limited space and quite inexpensively.

In the specific embodiment of the invention illustrated in the accompanying drawings, FIG. 1 is a fragmentary, elevational view, partly in section, of a camera showing one modification of a spring firing mechanism which may be employed with a percussive-type flashlamp.

Figure 1:
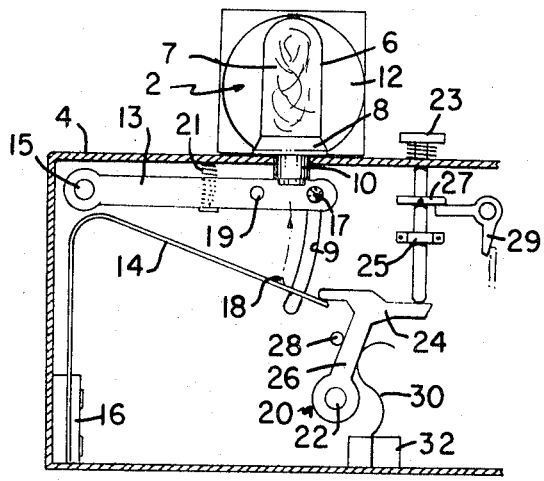

In the specific embodiment illustrated in FIG. 1 of the accompanying drawings, a photoflash lamp 2 of the percussive-type is supported on the top face of a camera body 4, a fragmentary portion of which is shown. The lamp 2 comprises an hermetically sealed glass envelope 6 having a primer secured thereto at one end thereof. The primer comprises a metal shell or base 8 having a depending cup 10 within which an anvil and a charge of fulminating material are disposed. The lamp 2 is centrally located with respect to a reflector 12 on the top face of the camera body and the depending cup 10 extends through an aperture provided therefore in the camera body. A flat spring 14 having a rectangular cross section of about 0.005 inch × 0.25 inch is securely held at one end thereof against an inside face of the camera body 4 by block 16. A hardened firing pin 18 having a radius of about 15 mils is secured to or formed integral with the spring 14 near the free end thereof. A trip hook 20 is pivotally mounted at 22 on an inside face of the camera body 4. The crosspiece 24 of hook 20 latches with the free end of spring 14 and holds the spring under tension. The leg 26 of hook 20 lies between a stop pin 28 which projects laterally from an inside face of the camera body 4 and a spring 30 attached to block 32 on the bottom inside face of the camera body 4.

Cocking of the firing spring 14 is effected by operation of a cocking lever 13 pivotally mounted at one end thereof at 15 on an inside face of the camera 4. An operating handle 17, secured to the other end of lever 13, extends through an elongated slot 9 provided therefor in the camera body 4. Thus the handle 17 is readily accessible to the operator. A pin 19 projects laterally from the lever 13 intermediate the ends thereof and overlies the firing spring 14. Thus in operation, the firing spring 14 is cocked by operation of the handle 17. As the cocking lever 13 is rotated clockwise about its pivot 15 as viewed in FIG. 1, the pin 19 projecting therefrom deflects the firing spring 14, depressing it until the crosspiece 24 of hook 20 latches with the free end thereof to hold the firing spring under tension. Spring 21 returns cocking lever 13 to its normal rest position as shown in FIG. 1. Although a separate handle 17 for actuating the firing spring cocking mechanism has been illustrated and described, it will be readily appreciated by those skilled in the art that the firing pin cocking mechanism, and more particularly the means for actuating it, could well be combined with the film transport and cocking of the shutter of the camera which are not shown here.

Release of the firing spring 14 may be effected in combination with the shutter release of the camera by operation of a spring-loaded plunger 23. The plunger 23 extends through the top of the camera and is stabilized inside the camera by a bracket 25 attached to the inside face thereof. The plunger 23 is provided with a collet 27 which, as shown in FIG. 1, overlies and touches a shutter release lever 29. In FIG. 1, the inner end of the plunger 23 is shown in engagement with the crosspiece 24 of the trip hook 20. Thus, when an operator depresses the plunger 23 to take a picture, the collet 27 thereof will trip the shutter release lever 29 and the inner end of the plunger will trip the hook 20 to release the firing spring 14. Thus, as shown, the shutter release and the firing spring are tripped practically simultaneously. Since, in some circumstances, it may be desirable to provide a time delay insofar as releasing the firing spring 14 is concerned, all that is necessary is to shorten the plunger 23 the desired amount so that the collet 27 trips the shutter release lever 29 before the free end of the plunger 23 makes contact with and trips the hook 20.

When the cocked firing spring 14 is released by the trip hook 20, it moves quite rapidly until the pin 18 thereon hits the cup 10 of the primer with a high impact velocity, of the order of 500 to 6,000 cms./sec., for example, depending upon the length of the spring, its cross section and its elastic properties, to thereby promote ignition of the charge of fulminating material disposed therein. Deflagration of the charge ignites the shredded foil 7 with which the lamp is provided to thereby "flash" the lamp. At this time the leg 26 of the trip hook 20 is over against the stop pin 28 and is returned to the FIG. 1 position when the firing spring 14 is cocked again.

Figure 2:
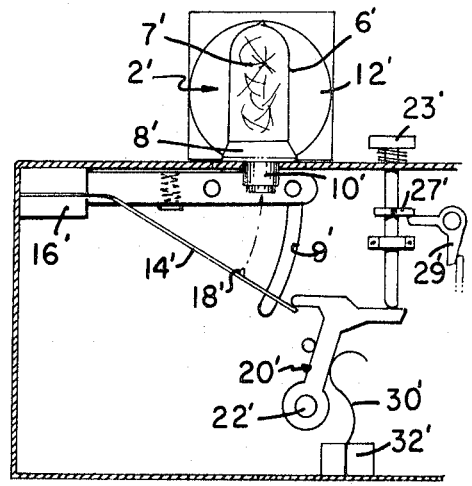
FIG. 2 is a fragmentary, elevational view, partly in section, of a camera showing another modification of a spring firing mechanism which may be employed with a percussive-type flashlamp.

FIG. 2 modification is similar to that of FIG. 1 except that the spring 14 is only about half as long and is a straight, single leg member rather than an L shaped member as in FIG. 1. Corresponding components have been identified with the same reference numbers primed.

Figure 3:
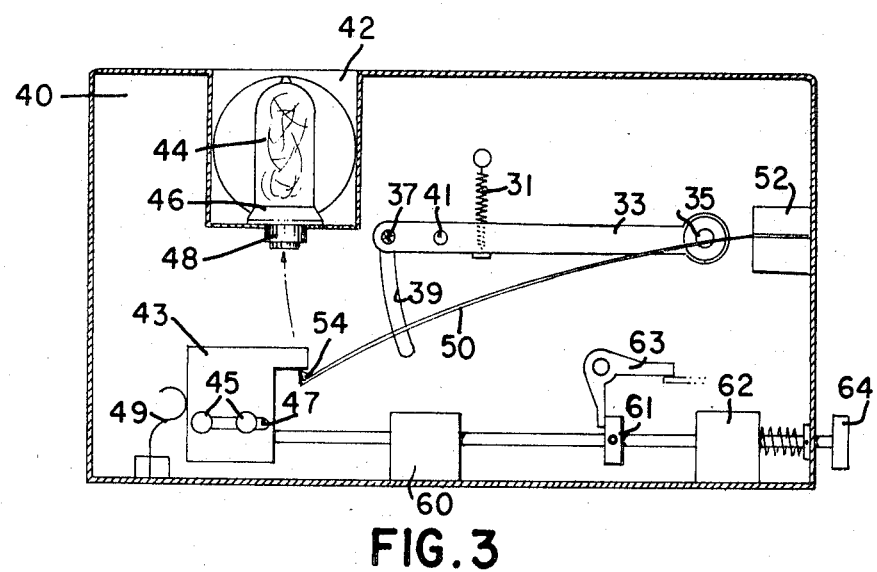
FIG. 3 is a fragmentary, elevational view, partly in section, of a camera showing another modification of a spring firing mechanism which may be employed with a percussive-type flashlamp.

In the FIG. 3 modification, the front face of a camera body 40 is provided with a niche 42 having a reflecting face and a percussive-type flashlamp 44 is securely seated therein. The lamp 44 has a primer secured thereto at one end thereof, said primer comprising a metal shell or base 46 having a depending cup 48 within which an anvil and a charge of fulminating material are disposed. A spring 50 is securely held at one end thereof in a block 52 secured to the camera body 40, and a firing pin 54 is located at the free end thereof.

Cocking of the firing spring 50 is effected by operation of a cocking lever 33 pivotally mounted at one end thereof at 35 on an inside face of the camera 40. An operating handle 37 secured to the lever 33 extends through an elongated slot 39 provided therefor in the camera body. A pin 41, projecting laterally from the lever 33, overlies the firing spring 50. Thus in operation the firing spring 50 is cocked by operation of the handle 37. As the cocking lever 33 is rotated counter-clockwise about its pivot 35 as viewed in FIG. 3, the pin 41 projecting therefrom deflects the firing spring 50, depressing it until it interlocks with a cocking latch 43. Spring 31 returns cocking lever 33 to its normal rest position as shown in FIG. 3. Latch 43 is supported on a pair of fixed pins 45 which extend through an elongated slot 47 therein. The latch 43 is urged forward by spring 49 and is free to reciprocate on the pins 45 within the limits defined by the slot 47. Although a separate handle 37 for actuating the firing spring cocking mechanism has been illustrated and described, it will be readily appreciated by those skilled in the art, as noted above in the description of the FIG. 1 modification, that the firing pin cocking mechanism, and more particularly the means for actuating it, could well be combined with the film transport and cocking of the shutter of the camera which are not shown here.

Release of the firing spring 50 may be effected in combination with the shutter release of the camera by operation of a spring-loaded plunger 64 slidably supported in bushings 60 and 62. The inner, free end of the plunger 64 normally abuts the latch 43. A collet 61 secured to the plunger 64 lies in the path of and engages shutter release lever 63. Thus when an operator depresses the plunger 64 to take a picture, the collet 61 will trip the shutter release lever 63 and the inner end of the plunger will displace the latch 43 a distance sufficient to permit the firing spring 50 to snap free therefrom, strike the primer and ignite the charge of fulminating material disposed therein. Deflagration of the charge ignites the shredded foil with which the lamp is provided to thereby "flash" the lamp.

Figure 4:
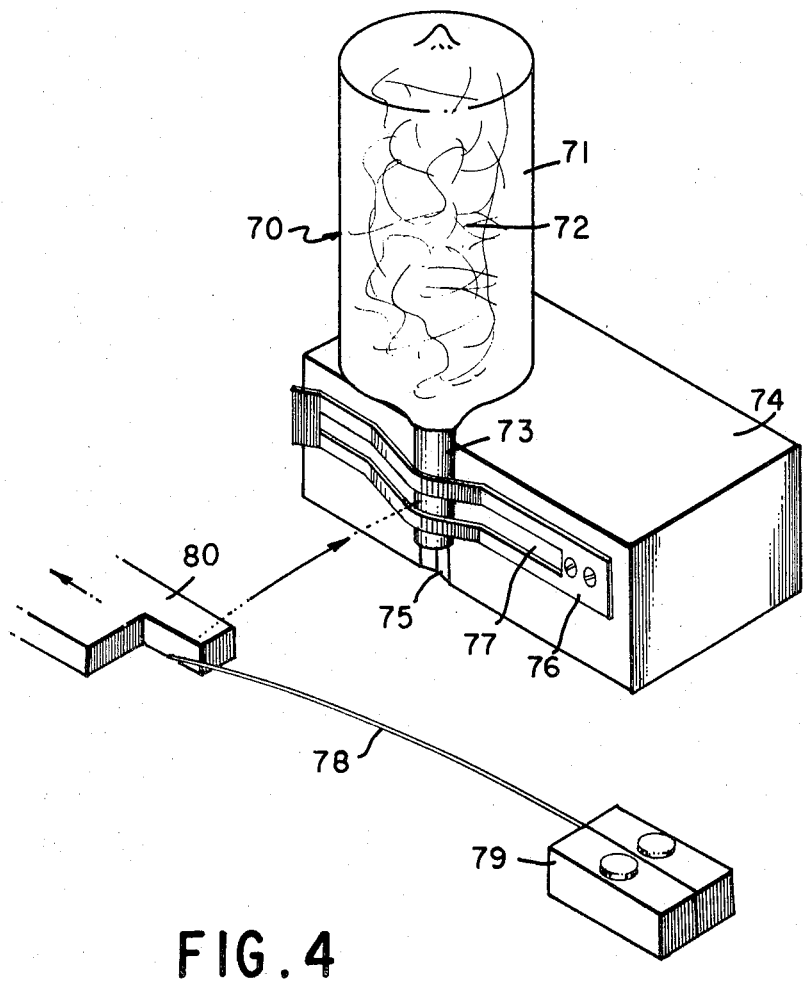
FIG. 4 is a detail in perspective of a lamp-spring firing mechanism assembly illustrating a firing mechanism of the type shown in FIG. 3 adapted for use with a different type of percussive flashlamp than the one shown in FIGS. 1—3.

As mentioned above in the brief description of the FIGS. the lamp of FIG. 4 is of a different type than the one shown in FIGS. 1—3 but the firing mechanism associated therewith is the same in principle as that shown in FIG. 3 and described above. The lamp 70 comprises an hermetically sealed, light-transmitting envelope 71 having a quantity of shredded foil 72 disposed therein and a primer tube 73 depending therefrom. The lamp 70 is supported on a firing clock 74 with the primer tube 73 thereof seated in a groove 75 provided therefor in the block. The lamp 70 is retained in position by a spring 76 secured at one end thereof to the firing block 74 and having an elongated slot 77 therein, particularly in the portion thereof which overlies the primer tube 73. The firing mechanism, of the type shown in FIG. 3, includes a firing spring 78 secured at one end in a mounting block 79 and held under tension at the other end by cocking latch 80. The firing spring 78 may be round or some other shape in cross section and need not be provided with a firing pin. As shown in FIG. 4 the firing spring itself is designed to strike the primer tube 73 at a point where the primer tube is exposed by the elongated slot 77 in the spring 76.

We claim:

1. A photographic camera for exposing film receivable in the camera and usable with disposable photoflash lamps; the lamps including a hermetically sealed envelope containing combustible material; the camera being adapted to be hand held and comprising:
   a casing;
   means for removably receiving a photoflash lamp on the casing;
   a shutter mechanism in the casing operative to expose film receivable in the camera;
   a body release on the casing for effecting operation of the shutter mechanism;
   a flash firing mechanism within the casing, said mechanism including a cantilever spring having an energized condition from which the spring is releasable to effect firing of the photoflash lamp, said mechanism including means for interconnecting said spring and said body release in the energized condition of said spring to release the spring and effect firing of the flashlamp in synchronism with operation of the shutter mechanism; and
   a setting lever accessible from outside the casing and movable from a first position to a second position to return the spring to the energized condition after release of said spring by said interconnecting means.

2. A photographic camera as claimed in claim 1, wherein said photoflash lamp includes a percussive firing element, and said spring is releasable to engage the element to fire the lamp.

3. A photographic camera as claimed in claim 2, wherein said firing element is a percussively ignitable primer element located at the base of the hermetically sealed envelope, and said spring is releasably directly to engage the primer element.

4. A photographic camera as claimed in claim 1, wherein said spring is releasable to effect a striking force at a velocity of 500 to 6,000 cms/sec.

5. A photographic camera as claimed in claim 1 wherein said spring is of substantially rectangular cross section.

6. A photographic camera for exposing film and usable with disposable photoflash lamps; the lamps including a hermetically sealed envelope containing combustible material; the camera being adapted to be hand held and comprising:
   a casing;
   means for receiving a photoflash lamp on the casing;
   a shutter mechanism in the casing operative to expose film in the camera;
   a body release on the casing for effecting operation of the shutter mechanism;
   a flash firing mechanism within the casing, said mechanism including a cantilever spring having an energized position from which the spring is releasable to effect firing of the photoflash lamp;
   a latch positioned to engage and maintain said spring in the energized position, said latch being movable to release said spring;
   means for moving said latch to release said spring in response to operation of said shutter mechanism by said body release; and
   a setting member accessible from outside the casing for moving said spring into latching engagement with said latch to energize the spring.